July 19, 1955    E. P. COOK    2,713,291
APPARATUS FOR INCREASING THE CONSISTENCY
OF FIBROUS SOLUTIONS
Filed Oct. 23, 1952    9 Sheets-Sheet 6

Inventor
Ernest P. Cook,
by Rowland V. Patrick
Attorney

United States Patent Office 2,713,291
Patented July 19, 1955

2,713,291

APPARATUS FOR INCREASING THE CONSISTENCY OF FIBROUS SOLUTIONS

Ernest P. Cook, Berlin, N. H., assignor to Brown Company, Berlin, N. H., a corporation of Maine Application October 23, 1952, Serial No. 316,435

9 Claims. (Cl. 92—20)

This invention relates to apparatus for increasing the consistency of fibrous solutions and is more specifically directed to apparatus which operates with improved efficiency and at high capacity to produce, in a continuous, as distinguished from a batch operation, fibrous solutions of very high consistency with but small fiber loss.

In the treatment of fibers such as wood pulp, it has been common practice—for example, in the case of viscose processing—to bring the consistency of the alkali cellulose solution, after its alkali treatment at consistencies below 5%, to a value of 37%.

Common type of continuous pulp thickeners which are used elsewhere in the pulp industry are not adapted for successful use in operations requiring outputs at such high consistencies as 37%. Some single cylinder pulp thickeners are designed to increase solids content only to a value of about 1% or less. By addition of a press roll, a mat can be taken off the cylinder for removal as a sheet above the level of the liquid in the thickener. Even the addition of such a press roll is generally regarded by the industry as only adequate to produce consistencies up to a maximum of about 12%.

Additional complication by multiplication of the press rolls and provision for suction on the cylinder renders it possible to achieve consistencies up to about 20%.

None of the devices can be used, however, for achieving the 37% density desired at one stage in viscose processing.

The art has hence resorted to a double cylinder press unit. In devices of this type, two cylinders are mounted horizontally in spaced relation so as to provide a small nip, usually of the order of ⅜–½ inch, such cylinders having a diameter of the order of 24 inches. The lower portions of the two cylinders are confined in a pressure box into which the slurry is fed from below. The cylinders are rotated in opposite directions with their surfaces rising at the nip for the purpose of squeezing the pulp as it approaches, and is moved up through, the nip by the rotating cylinders.

Whereas the industry has accepted this device for commercial use with some types of pulps, its limitations and disadvantages are great compared with the apparatus of this invention.

One limitation of the double cylinder press unit is that the fiber loss, already great in the case of softwood, becomes prohibitively high in the case of hardwood pulp. The fiber losses are caused, in my judgment, by frictional effects present near the surface of the rolls as they move towards the nip. There is a tendency, because of the thickness of the stock below the rolls, for the fiber layers to rub off even after they start to form on the cylinder surfaces and each time an initial forming layer is rubbed off, new groups of fibers become exposed to the filtering surface, and there is considerable fiber loss through the filtering surface every time an initial fiber layer has to form. In other words, there is a multiplication of fiber loss due to the repeated reforming of the initial layer. Any fibers which go out with the filtrate become exposed to the alkali cellulose for a period of time longer than the designed cycle and hence are subjected to excessive caustic action. In the case of softwood where the fibers are relatively long, this rubbing off, while troublesome from the standpoint of fiber loss, can be tolerated and, hence, the apparatus is economically feasible for softwood, but in the case of hardwood with its short fibers, the losses are so prohibitive that the apparatus becomes impractical.

Moreover, in the case of either softwood or hardwood pulp, the capacity of the unit is low to begin with, and rapidly decreases. High roll speeds are impossible because the approach of the surfaces to the nip is relatively abrupt and, hence, there is only a space of limited length wherein the final squeezing action takes place. In order to remove the filtrate from the pulp, the pulp must remain in this space for a finite length of time. With too great roll speed, either the pulp does not remain in this space long enough to remove the filtrate to the desired high consistency or else the mass clogs and there is slippage of the rolls without pulp output.

Consequently, even with a clean press unit, initial operation is slow, often at only ½ revolution per minute of the cylinders. As the unit continuously operates, the consistency of the slurry in the press box rises. As it rises, fiber loss increases, capacity falls off and power demands increase until a point is reached requiring disassembly and cleaning. I have seen press box units where cleaning is required after no more than ten days' operation and then the press box has to be dug out with picks.

In short, there has been great dissatisfaction with the only continuous operation units known to the industry which can attain 37% consistency even in their limited application to softwood pulps.

Objectives of this invention are, therefore, to provide apparatus for the continuous treatment of fibrous solutions to raise their consistencies to at least as high as 37% which will operate with greater capacity, with less power and which will have small fiber loss not only in the case of softwood pulp but also in the case of hardwood pulp, thereby permitting for the first time in a continuous process the thickening of 100% hardwood pulp to as high as 37% consistency.

Apparatus of this invention is so constructed that its capacity is maintained over long periods of time without necessity of shut-down; increased capacity lessens the capital expenditure involved for a given output; and increased efficiency results in substantial operating savings.

In order to attain the above stated objectives, I have resorted to a type of apparatus wherein the nip is formed between the outer surface of an internal cylinder and the inner surface of an external cylinder, the two cylinders rotating at the same peripheral speed and rising at the nip, in combination with location of the nip at such a position with relation to other parts and features of the apparatus as to assure that the filtrate removed from the pulp by the squeezing pressure applied during the approach to the nip is not permitted to re-wet the pulp. Only in this way can consistencies as high as 37% be achieved in this type of apparatus.

A typical embodiment of my invention is disclosed in the accompanying drawings in which.

Figure 1:
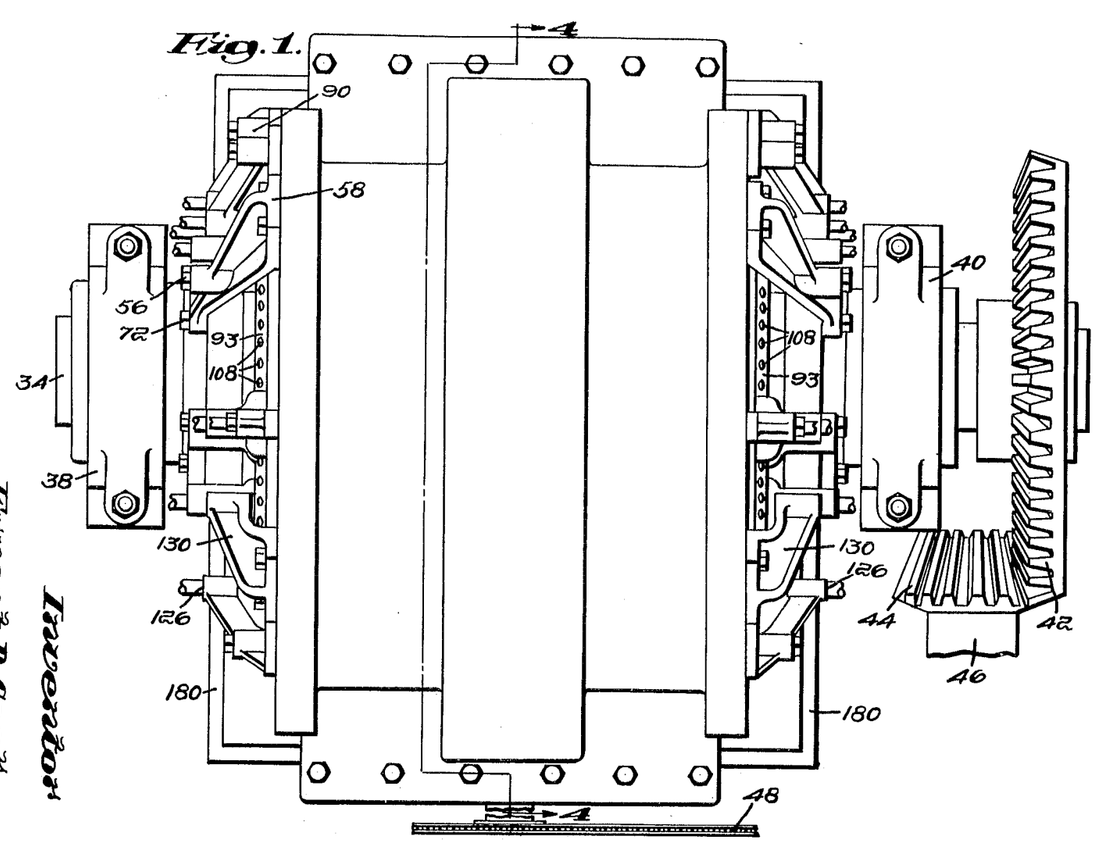
Fig. 1 is a plan view of the assembled apparatus.
Figure 2:
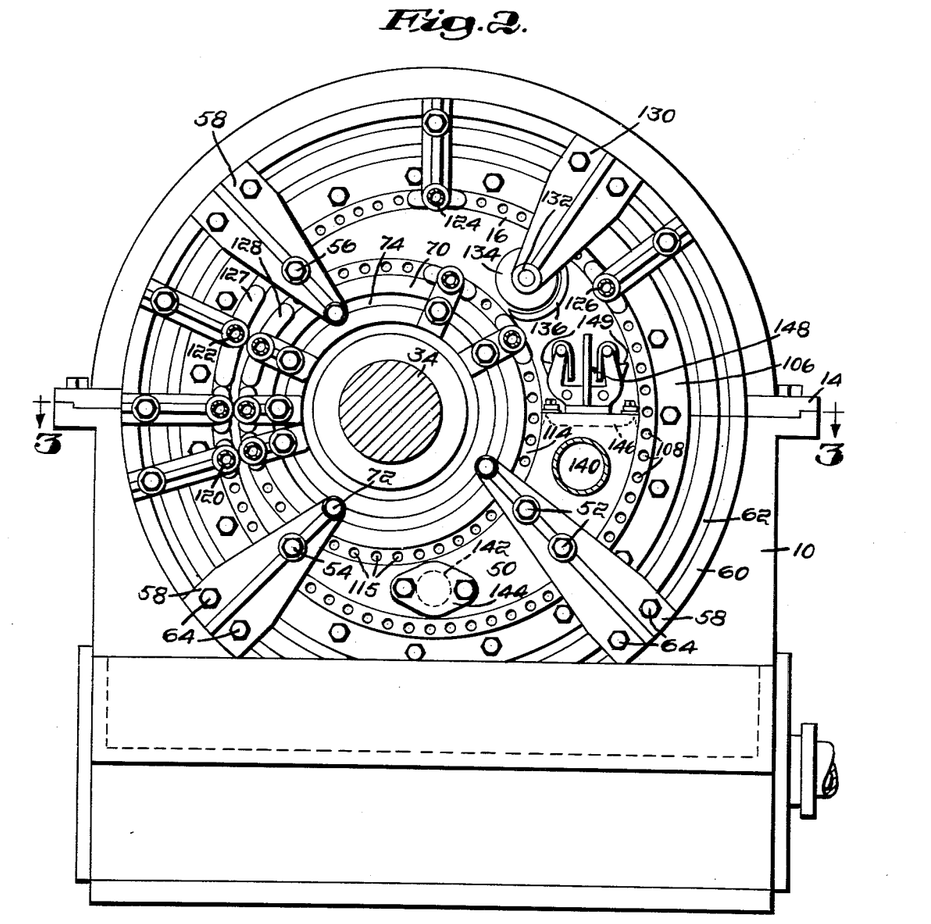
Fig. 2 is an end elevational view of the apparatus viewed from the left of Fig. 1.
Figure 3:
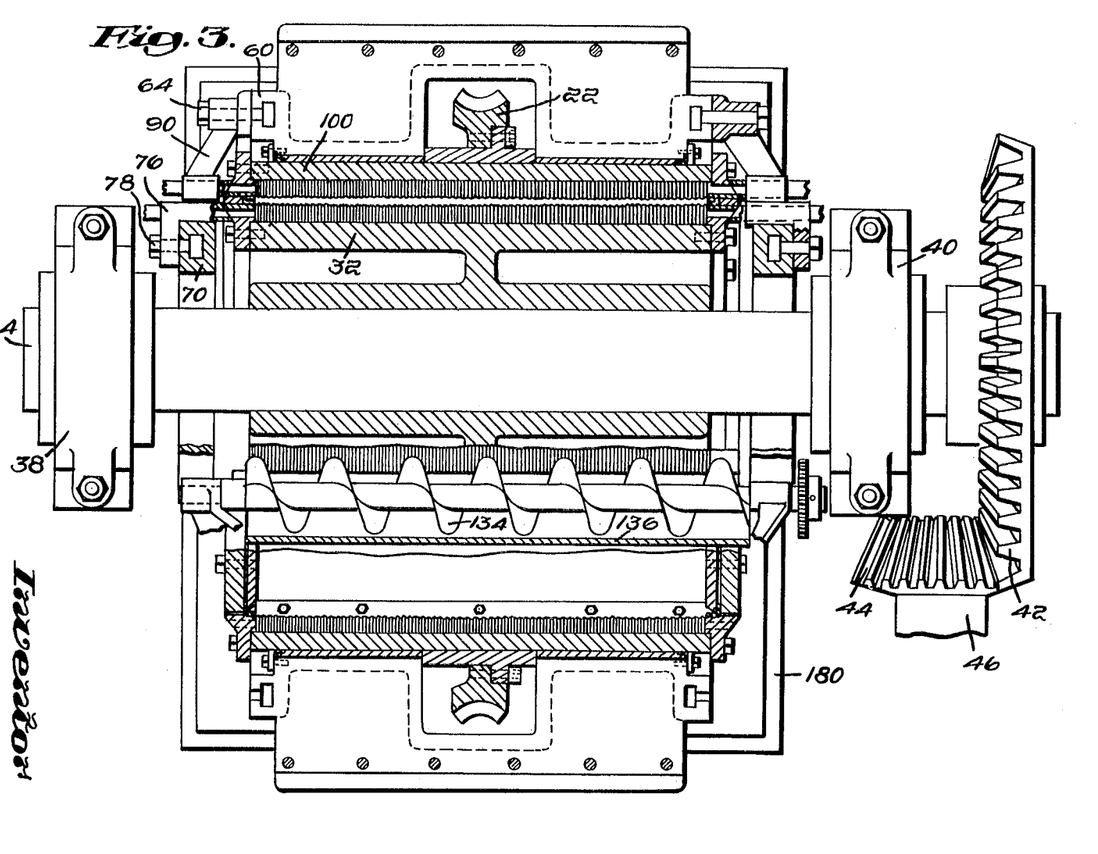
Fig. 3 is a cross-sectional view taken along the lines 3—3 of Fig. 2.
Figure 4:
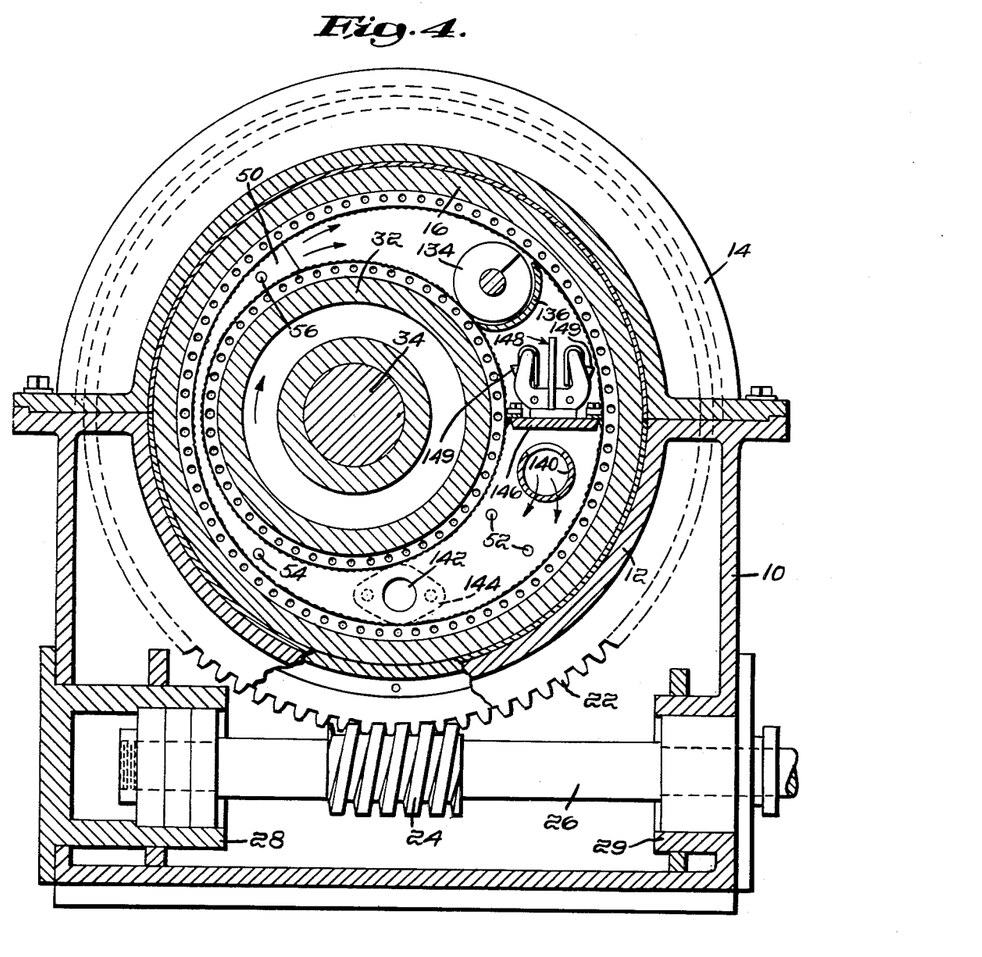
Fig. 4 is a sectional elevational view taken above the broken line along the line 4—4 of Fig. 1.

Referring to Figs. 1–5, the apparatus is provided with a bearing housing 10 which includes a semi-circular bearing 12 which, in cooperation with the bearing housing cap 14, provides a cavity for rotation of an outer cylinder 16. The bearing housing and bearing housing cap are provided with suitable bushings 18 and 20 (Fig. 5) for supporting a hollow cylinder 16 which rotates therein. As shown in Fig. 4, the cylinder 16 centrally thereof is provided with an external worm gear 22 which meshes at the bottom with a worm 24 carried by transverse shaft 26 journalled in bearings 28 and 29. An internal cylinder 32 is mounted within the hollow cylinder 16 on a shaft 34 supported by the bearing housings 38 and 40. As shown in Fig. 4, the shaft 34 is so mounted relative to the axis of the outer cylinder 16 that the inner cylinder 32 rotates on an axis which lies in the horizontal plane of the axis of the outer cylinder but to the left thereof, as shown in Fig. 4, so that the nip formed between the inner surface of the outer cylinder 16 and the outer surface of the inner cylinder 32 falls on the horizontal center plane of the apparatus. The two cylinders are adapted to be driven from a common power source (not shown) so that their peripheral speeds are identical, the inner cylinder shaft 34 being provided with a bevelled gear 42 and pinion 44 mounted on a drive shaft 46 and the outer cylinder shaft 26 being provided with a chain drive 48 which can be connected to the common power source. In order to prevent the flow of liquid from the space between the two cylinders at the opposite ends of the machine, I provide flat crescent-shaped plates 50, one of which is shown in Fig. 2. They extend from the horizontal center line at the right 180° clockwise around the nip and up to a point substantially above the nip. These plates are held in stationary position by attachment through bolts 52, 54 and 56 to a series of brackets 58 (Fig. 2) which extend radially inwardly from slotted outer rings 60 fast to the housing 10. The slots 62 of the outer rings 60 are T-slots for the purpose of permitting the fastening of the brackets 58 to the outer rings 60 by the interposition of bolts 64 in the T-shaped recesses 62.

The bolts 52, 54 and 56 also hold against the inner surface of end plates 50, running seals 65 (Fig. 6) with end surface portions of the inner and outer rotating cylinders.

Figure 6:
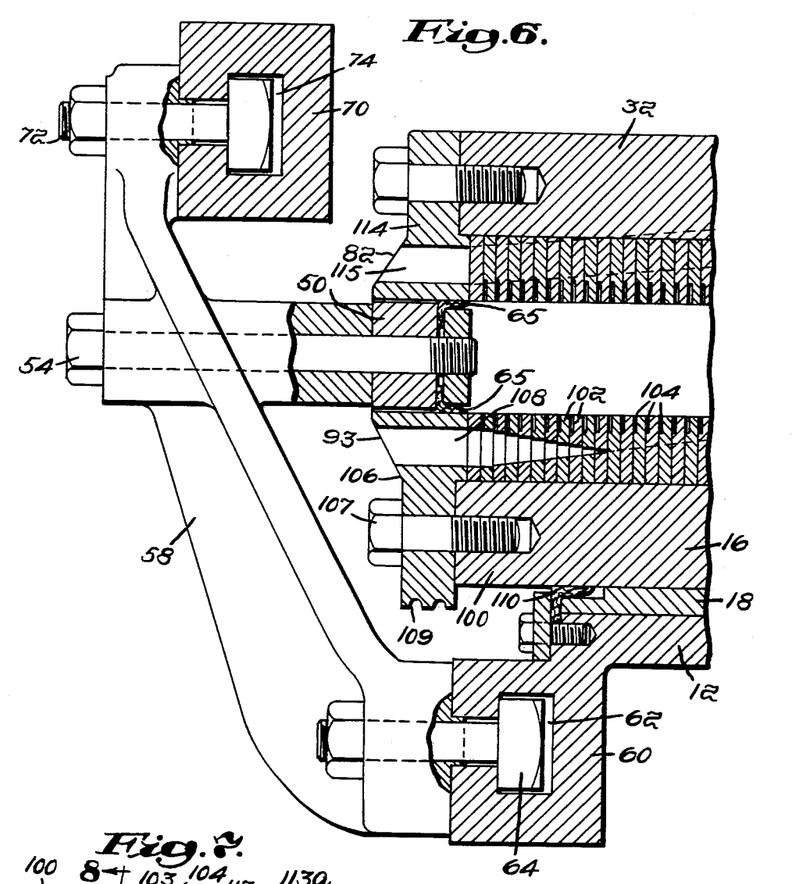
Figs. 6 and 7 are enlarged sectional details of certain parts of the apparatus.

As shown in Figs. 2 and 6, the brackets 58 extend radially inwardly but axially outwardly beyond the crescent-shaped plate-supporting bolts to support inner rings 70 through the interposition of bolts 72 which are locked to the inner rings 70 by means of T-shaped slots 74 in a manner similar to the mounting on the outer rings 60.

Figure 9:
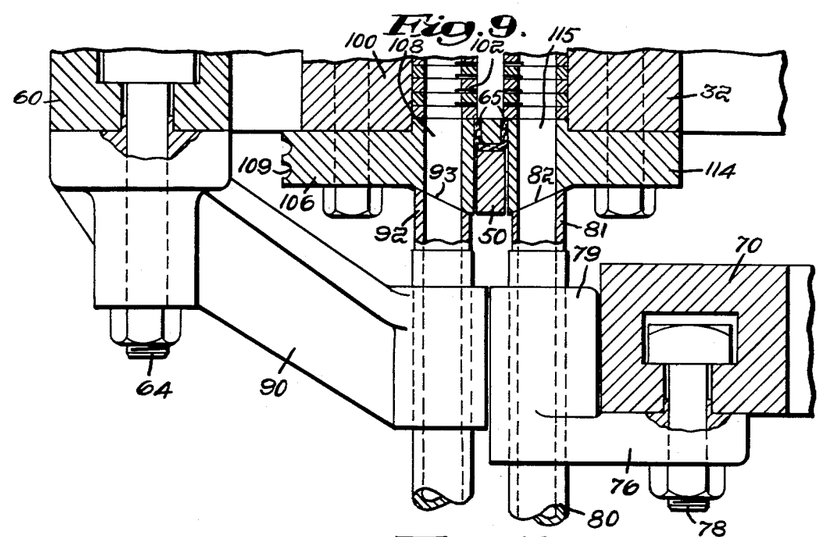
Fig. 9 is an enlarged detail of an upper left-hand portion of Fig. 3.
Figure 10:
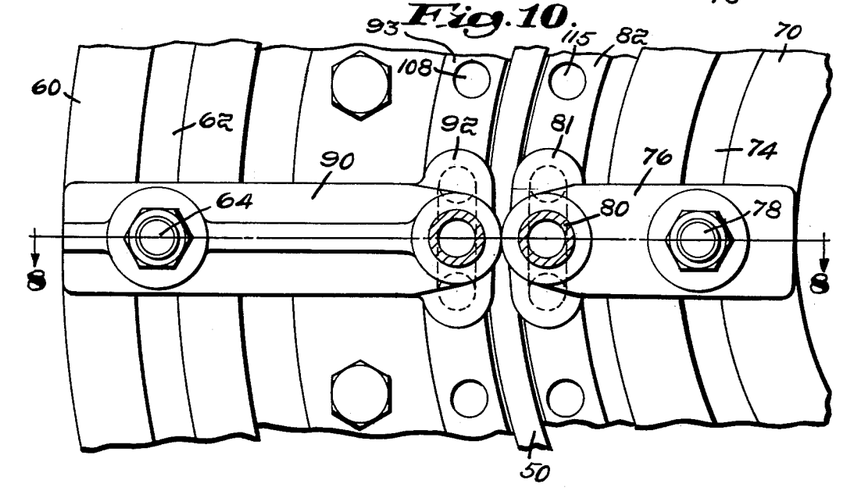
Fig. 10 is an elevational view of the parts shown in Fig. 9.
Figure 11:
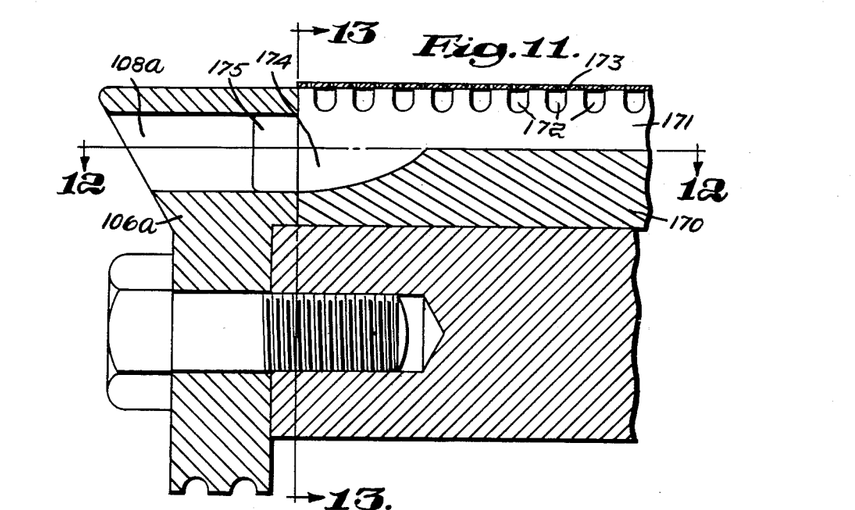
Fig. 11 is a detail of a modified form of the outer cylinder construction.
Figure 12:
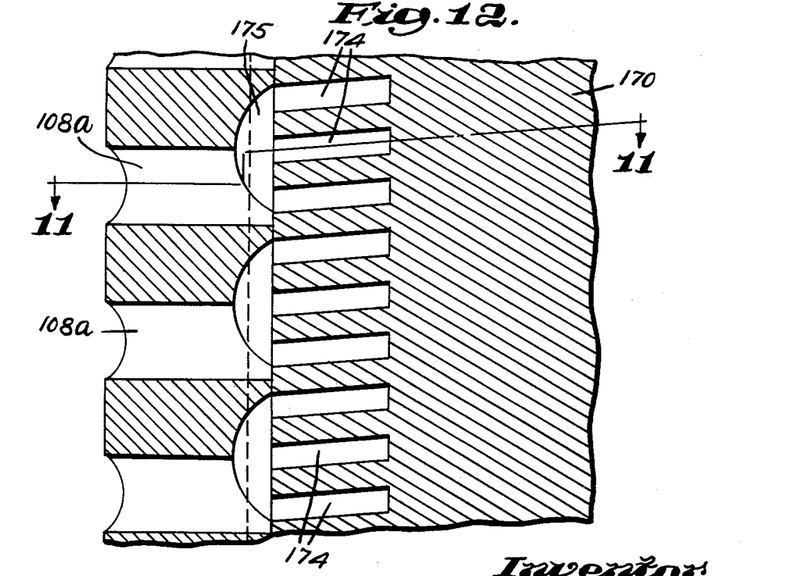
Fig. 12 is a sectional view of the modified form taken along the line 12—12 of Fig. 11.
Figure 13:
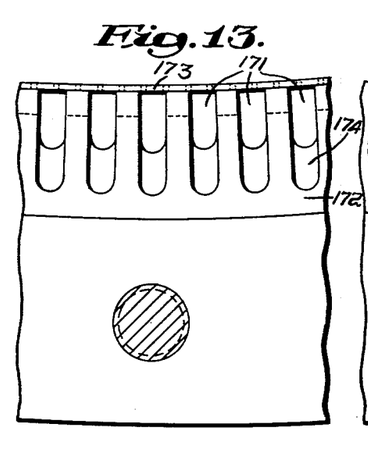
Figs. 13, 14 and 15 are other detail views of said modified form.
Figure 14:
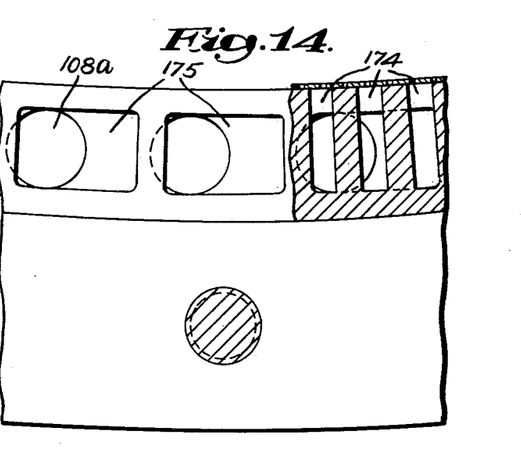
Figure 15:
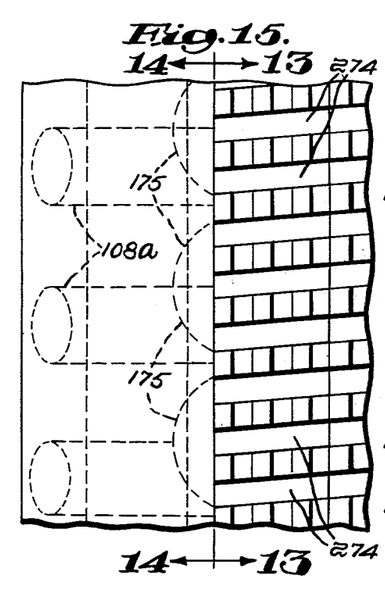

I provide the inner rings 70 for the purpose of mounting thereon the stationary portions of rotary valves for the inside cylinder. Five such rotary valves for the inner cylinder are shown in Fig. 2, there being five duplicate valves at the other end of the apparatus. Since each of these valves is mounted on the inner rings in an identical manner, it will suffice to describe the mounting of one, as shown in Figs. 9 and 10, which is the valve at the nip. A bracket 76 is bolted to the inner ring 70 by a bolt 78 and is provided with a bearing 79 for receiving a pipe 80, the inner end of which is provided with an elongated shoe 81, conical on its inner face, to match the cooperating portion 82 of the rotary valve which is a bevelled end surface on the inner cylinder 32.

In a similar manner, the outer rings 60 carry a series of brackets 90, each of which, by similar supporting means, carries an elongated shoe 92 adapted to bear against the cooperating rotary valve part 93 carried by the outer cylinder. The bearings of brackets 76 and 90 are provided in order that the shoes 81 and 92 may be supplied with resilient means for causing endwise yielding engagement of the inner ends thereof against the rotating parts 82 and 93 of the valves.

Figure 7:
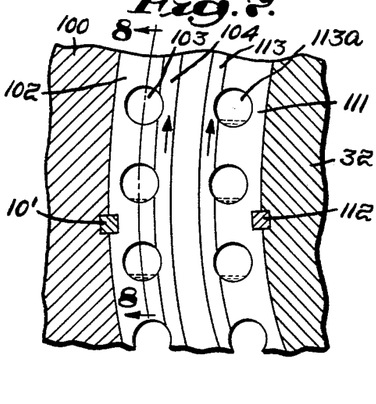

Turning now to the construction of the cylinders, as most clearly shown in Figs. 6 and 7, the outer cylinder is constituted of a thick metal ring 100 inside of which are secured by a press fit and key 10′, a series of ground rings 102 all of identical dimension. Each ring is provided around its peripheral surface with a series of transverse holes 103 equally spaced from one another and each of the rings is relieved from its inner edge outwardly to a radius beyond the radius of the inner side of the series of holes 103 so that when they are assembled side by side they will form an internal cylindrical surface which has annular slots 104 communicating with the holes 103.

Figure 5:
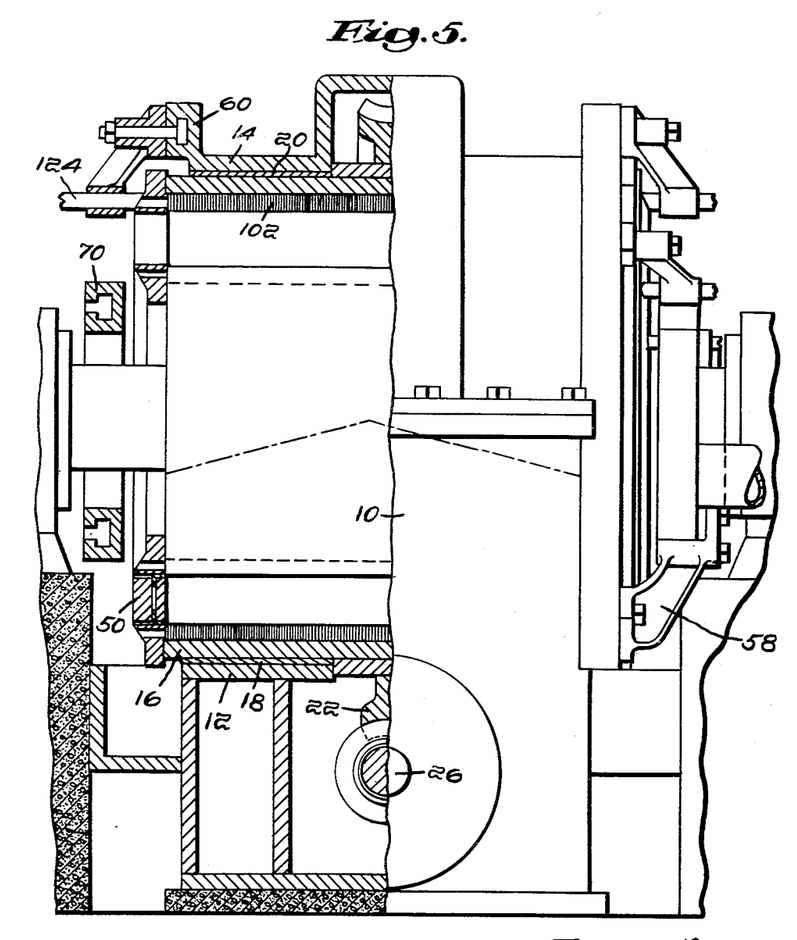
Fig. 5 is a front view, partly in section of the apparatus.
Figure 8:
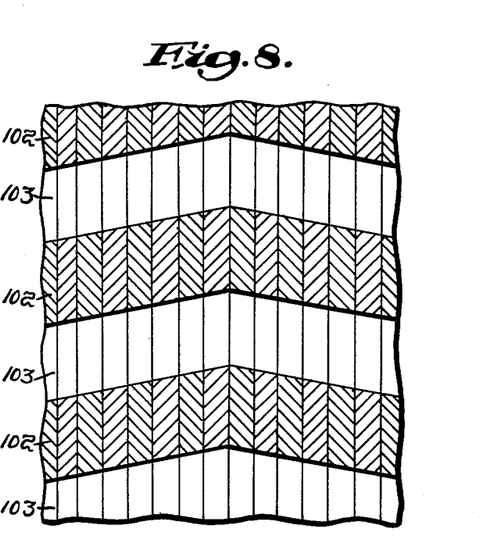
Fig. 8 is a developed sectional view taken along the arc 8—8 of Fig. 7.

Instead of assembling the series of rings 102 so that the holes 103 are aligned parallel to the main axis, I assemble the rings in such manner that the holes 103 are inclined from the center of the machine towards each end thereof in the manner shown in Fig. 8 and following the dot-and-dash line of Fig. 5, forming collectively a helical passage which is pitched downwardly with respect to the axis of the cylinder on each side of the middle of the cylinder when the holes 103 of the passage are rising at the nip. In order that the surfaces of the passage shall be smooth and uninterrupted, the holes 103 are drilled at a corresponding angle to the axis of each ring and, in order that the assembly shall be accurate, each ring is provided with a keyway which is progressively offset further with respect to a single hole. The series of rings 102 are clamped at each end of the cylinder by a rotary valve ring 106 which is secured with cap screws 107 to the metal ring 100. A portion of this ring 106 is shaped to form the rotary valve surface 93 previously referred to, to cooperate with the previously described shoe 92 of the stationary portion of the rotary valve. Ring 106 has a series of ports 108 which register with each of the holes 103 in the outermost ring 102.

The outer periphery of the rotary valve rings 106 are grooved at 109 to provide a drip interceptor which will tend to prevent liquid from gaining access to oil-retaining rings 110 which provide, at each end, an oil seal between the bearing surface of the ring 100 and bushings 18 and 20.

The construction of the inner cylinder with regard to its slotted surface and holes is identical with the exception that the diameters are such that the rings 111 (Fig. 7) have a press fit over the cylinder 32; the keyways for keys 112 (Fig. 7) are on the inside of the rings instead of the outside; and the relieved portions 113 are on the outer edges of the rings to communicate with holes 113a.

A rotary valve ring 114 for the inner cylinder with ports 115 is likewise provided in order that the inner cylinder surface 82 will cooperate with the stationary shoe 81.

Further rotary valves on the outer ring 60 are provided (Fig. 2) at 120, 122, 124 and 126, respectively, with corresponding opposed rotary valves on the inner ring 70, for purposes to be later described. These are all constructed and assembled in the same manner as those shown in Figs. 9 and 10, except that the shoes 127 and 128 (Fig. 2) of valves 122 and the opposite inner cylinder valves, respectively, are more elongated.

A bracket 130, shown in the upper right-hand quadrant of Fig. 2, is also mounted on the outer ring 60 in order to support journals 132 for carrying a screw conveyor 134 extending transversely of the apparatus and cooperating with a screw casing 136, the upper and lower ends of which are bevelled for close clearance with the outer and inner cylinders, respectively, for the purpose of receiving the pulp mat formed on the two cylinders and delivering it from the apparatus.

A stock supply pipe 140 passes through one or both end plates 50 and the end plates may also be provided with trap holes 142 with bolted covers 144 for the purpose of washing out the stock compartment. The stock supply 140 may comprise a pipe which is opened across its top between the two end plates 50, as shown in Fig. 4. It is optional whether the stock is fed from one or both ends to the apparatus.

As shown in Figs. 2 and 4, the stock compartment has a cover plate 146 spanning the space between the two end plates 50, and on top of this cover plate is mounted a scraper assembly indicated generally at 148. This device forms no part of the invention but is provided to aid in cleaning the slots of the cylinders where the form of filtering surfaces shown in Figs. 1-10 of the drawings is used. The scraper assembly has a series of blades 149 which may be selectively moved in and out of the slots 104 and 113, respectively, for cleaning purposes, i. e. to remove any fibers from the filtering surfaces which do not pass into the screw casing 136 or are not removed by back-washing through valves 126.

Figs. 11-14 show a modified form of construction which may be utilized instead of the slotted construction for either the inner or the outer cylinders or both.

In this form, a hollow cylinder 170 is provided with transverse grooves 171 and with a series of spaced circumferential grooves 172 providing a grid. This grid is covered with a perforated plate 173 secured by welding or other means. Near the end of the cylinder, the transverse grooves 171 are deepened, as shown at 174, and lead into rectangular ports 175 in the rotary valve ring 106a which, in turn, communicate with round ports 108a forming the rotary valve ports.

Beneath each end of the cylinders are positioned a filtrate collector 180 to receive such filtrate as flows out the ends of the machine and any back-wash, if utilized.

Where it is intended to increase the consistency of a stock to 37%, such stock may be continuously fed into the stock inlet 140 filling the stock compartment between plates 50. The filtrate will flow through the slotted or perforate outer and inner cylinders quickly building up layers of fiber on both the inner and outer cylinder. As the cylinders rotate towards the nip halfway up the left-hand side of the apparatus, the gradually decreasing space between the cylinders will cause the filtrate to be squeezed out of the layers to the point where the layers join. The first and second sets of rotary valves oppositely placed on the inner and outer cylinders have suction applied thereto in order, just prior to and at the nip, to draw filtrate from the cavities in both the outer and inner cylinders. With the application of vacuum at these points, there is less danger of filtrate which remains in the slots of the cylinders being carried up by rotation and capillary action to a point above the horizontal line and beyond the nip where such retained filtrate would re-wet the pulp. As an added precaution, the third sets of rotary valves 122 are provided with air pressure which, in cooperation with the vacuum valves, create a pressure minimizing upward movement of filtrate in the slots or grooves aiding in evacuating the filtrate through the vacuum valves at this critical point.

The fourth sets of rotary valves 124 are air pressure valves, located at the top, for loosening the mats from the two cylinders so that the mats may be more easily deposited in the conveyor casing 136. The fifth and last sets of rotary valves 126, being beyond the removal screw 134, may be utilized for back-washing the slots or grooves, for rewetting any remaining pulp and/or to facilitate the cleaning of the slots with the cleaning blades 149.

The relatively gradual approach of the cylinder surfaces as they come into the nip presents a long traverse of pressing action and, hence, the cylinder may be operated at higher peripheral speed while still permitting the pulp to remain under squeezing action for a sufficient period of time to remove the filtrate to bring the pulp to 37% consistency. The combination of vacuum and pressure action from the rotary valves reduces the re-absorbent tendency, as the pulp mat emerges from the nip, for, as the cylinders pass the horizontal nip line, the squeezing action ceases and the pulp begins to expand and has a great affinity for moisture. If the holes 103, or grooves 171 and 172, particularly in the outer cylinder, retain filtrate as the outer cylinder passes upwardly, there is danger that that filtrate will pass back into the slots or perforations and, hence, into the pulp due to the action of gravity and the tipping, so to speak, of the holes as the holes rise to the top of the machine. Hence, the rotary valve operations are intended to insure that little, if any, filtrate is left in either the slots, grooves or perforations after the passage through the nip.

While the apparatus of this invention is adapted for use in a one-stage consistency-increasing process so that the consistency of stock may be increased in one passage through the apparatus from a consistency below 5%, e. g. about 4%, to as much as 37%, the apparatus is also useful in carrying out the last stage of a multi-stage consistency-increasing process. Thus a 4% stock emerging from the alkali treatment in viscose processing can be first thickened on any of the common types of continuous pulp thickeners now used in the pulp industry, to bring the consistency from 4% anywhere up to 12% and then the present apparatus can handle the 12% stock to further increase the consistency up to 37%. This type of multi-stage operation has the advantage of increasing the capacity of the apparatus of this invention, since the reduced amount of filtrate requiring removal in the final stage in this apparatus permits its speed of operation to be greater. Hence, there is economy in using the multi-stage operation because, by the provision of less expensive initial stage equipment, the number of more expensive and complicated units of this invention may be fewer for any given desired large scale output. With consistency inputs approaching 12%, fiber loss in the present apparatus also will be reduced.

In order that the stock may be mechanically handled in such a multi-stage process, one may use ordinary stock pumps to handle any thin stock of say a consistency of about 4% or less, but after an early stage of thickening has brought the pulp to a consistency above 4%, special thick stock pumps must be provided. One such type of thick stock pump which will easily handle stock of 12% consistency is described and claimed in my prior Patent No. 2,460,278 dated February 1, 1949. An example of a two-stage process then includes a conventional stock pump feeding stock of 4% consistency to a conventional type of single cylinder pulp thickener having a press roll followed by a thick stock pump such as that shown in the aforesaid patent interposed in a line connecting the output line of the rotary thickener and the input line of the apparatus of this invention.

I claim:

1. Apparatus of the character described comprising inner and outer rotating cylinders having opposed filtering surfaces rotating in paths forming a nip of minimum clearance between said surfaces, internal circumferentially spaced passages in said inner and outer cylinders leading from said filtering surfaces axially towards at least one end of said cylinders, and rotary valves at the said ends of said cylinders for applying pressure changes to said passages at spaced points in the revolution of said cylinders.

2. Apparatus as claimed in claim 1, wherein one set of rotary valves is provided for said outer cylinder and one set of rotary valves is provided for said inner cylinder, said valves including stationary elements, and inner and outer annular stationary supporting rings, one at each end of said cylinders for supporting said stationary valve elements.

3. A cylindrical filter comprising an annulus having a series of radially extending openings leading from a surface thereof to internal circumferentially spaced passages extending helically with respect to the axis of said surface.

4. A cylindrical filter as claimed in claim 3, wherein each passage extends helically with opposite pitch from a point between the ends of the cylindrical surface towards said ends.

5. A filtering surface constituted of a series of identical thin annular rings, said rings each having a series of circumferentially spaced holes and being of reduced thickness radially from an arc intersecting said holes to an edge of the ring, said rings being assembled in side-by-side relation about a common axis but said rings being progressively offset circumferentially so that said holes form a series of helical passages, each of said passages communicating with the filtering surface through the slots formed by said areas of reduced thickness between the assembled rings.

6. A filtering surface as claimed in claim 5, wherein the rings are progressively offset in such manner that the passages are pitched oppositely from a point between the ends of the assembly towards the ends thereof.

7. In apparatus of the character described comprising inner and outer rotating cylinders having opposed filtering surfaces rotating in paths forming a nip of minimum clearance between said surfaces, a series of internal axially extending circumferentially spaced passages within at least one of said cylinders, said passages being in communication with the filtering surface of said one cylinder for withdrawing filtrate out of an end of the apparatus and radially spaced stationary elements located at said end of the apparatus and disposed in opposed relation to the path of rotation of the ends of said passages and forming a series of rotary valves successively registering with the ends of said passages in rotation of said cylinder for applying suction or pressure to said passages.

8. Apparatus as claimed in claim 7, wherein the said passages are pitched with respect to the axis of the cylinder, whereby filtrate will drain by gravity more rapidly than when horizontal from said passages as they progressively approach said nip during rotation of the cylinder.

9. Apparatus as claimed in claim 7, wherein the said passages are oppositely pitched with respect to the axes of the cylinders from the center of the cylinder face toward the ends of the cylinder, whereby the middle of each passage will pass by the nip in advance of the ends of said passage.

References Cited in the file of this patent

UNITED STATES PATENTS

| | | |
|---|---|---|
| 714,856 | Birkholz | Dec. 2, 1902 |
| 1,032,167 | Vernsten | July 9, 1912 |
| 2,254,517 | Fleming | Sept. 2, 1941 |
| 2,365,658 | Schumacher | Dec. 19, 1944 |
| 2,494,195 | Penton | Jan. 10, 1950 |

FOREIGN PATENTS

| | | |
|---|---|---|
| 171,206 | Great Britain | of 1921 |